March 1, 1932.   J. OLDHAM   1,847,976
ANIMAL RACING APPARATUS
Original Filed April 29, 1930    2 Sheets-Sheet 1

Inventor:
June Oldham,
By Spear Middleton Donaldson Hall
Attys.

March 1, 1932.　　　　J. OLDHAM　　　　1,847,976
ANIMAL RACING APPARATUS
Original Filed April 29, 1930　　2 Sheets-Sheet 2
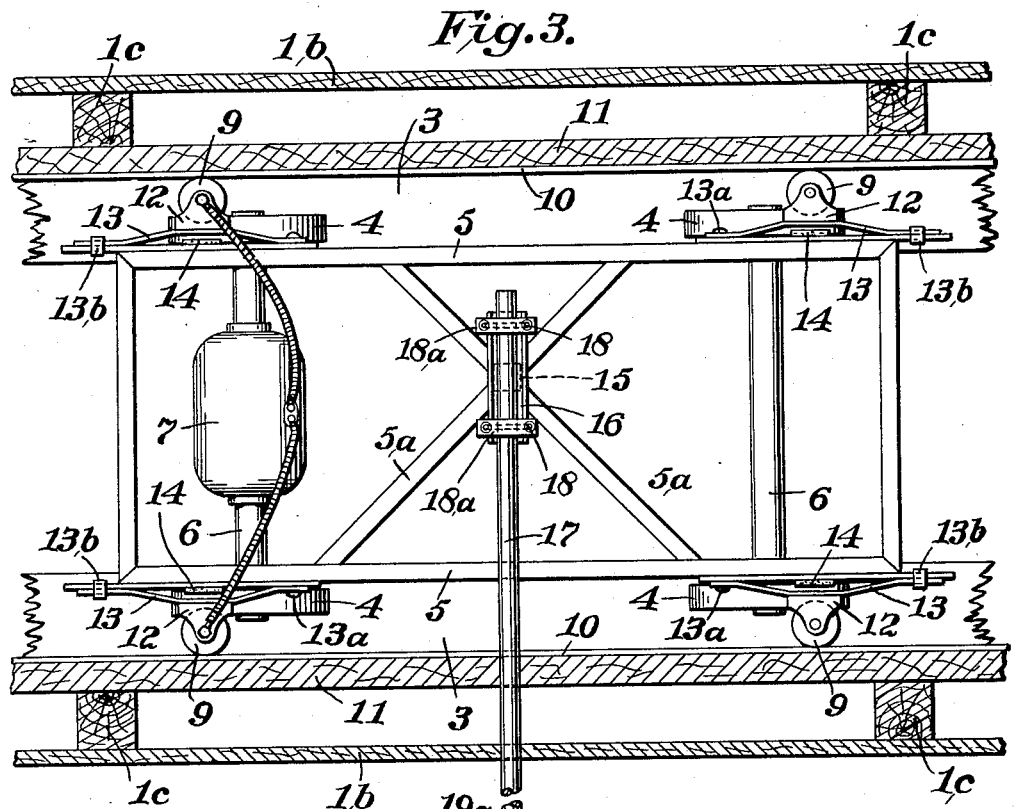
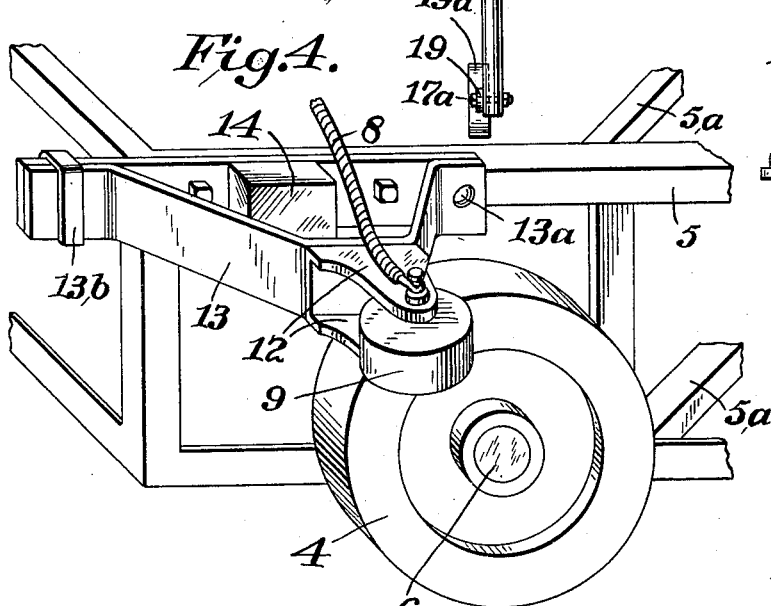
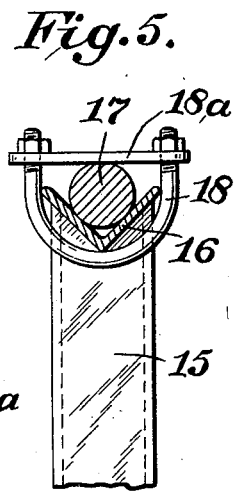
Inventor:
June Oldham,
By Sfuar Middleton Donaldson & Hall
Attys.

Patented Mar. 1, 1932

1,847,976

UNITED STATES PATENT OFFICE

JUNE OLDHAM, OF TULSA, OKLAHOMA

ANIMAL RACING APPARATUS

Application filed April 29, 1930, Serial No. 448,330. Renewed July 25, 1931.

My said invention relates to improvements in animal racing apparatus of the character in which dogs or similar animals are induced to race about a track by means of a lure or object, such as a rabbit mechanically conveyed along the track by means of an electrically propelled carriage.

The invention aims to provide mechanical conveying means, which, by reason of its simplicity of construction, may be easily and economically installed.

A further object is to provide a construction which will be durable and reliable in operation and one in which repairs or adjustments, if needed, may be readily effected.

A further object is to provide a construction which will be free from liability of damage from heavy rains, and one in which the carriage will be accurately guided with full freedom of movement and one in which an uninterrupted supply of electric current for propulsion will be assured.

The invention also aims to provide a construction in which the lure or rabbit will be supported in a manner which will give it a more life like appearance, and in which liability of injury to the dogs will be avoided.

With these and other objects in view the invention includes the novel features of construction and arrangement and combination of parts hereinafter described and defined by the appended claims.

An embodiment of the invention is illustrated in the accompanying drawings in which Figure 1 is a plan view.

Fig. 3 is a sectional plan view of Fig. 2.

Fig. 4 is a perspective view of one corner of the car, and

Fig. 5 is a transverse section, showing the arm clamping means.

Figure 1:
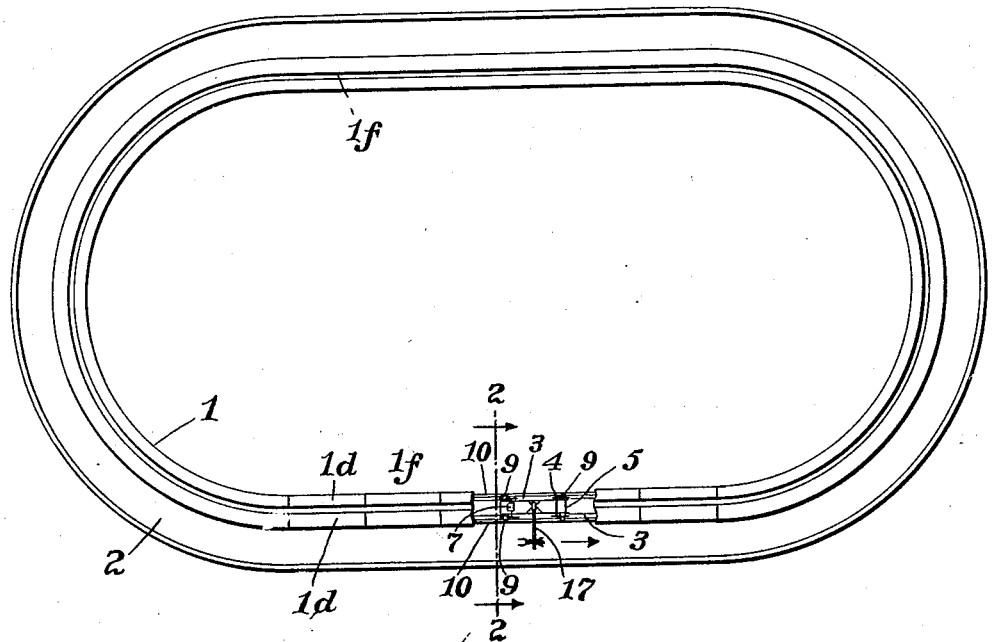
Figure 2:
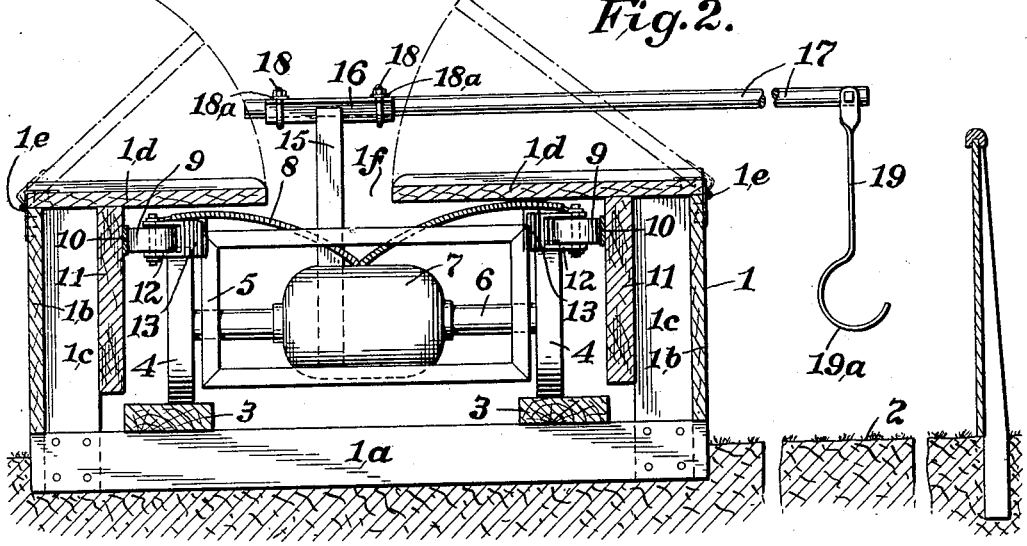
Fig. 2 is an enlarged section on line 2—2 of Fig. 1.

In proceeding according to my invention I provide a housing or casing 1 which is arranged parallel to or concentric with the track 2 and on the inside thereof, and is made in endless form. This housing comprises bottom sills 1a designed to be placed upon the surface of the ground adjacent the track 2, vertical sides 1b secured to upright posts 1c carried by the ends of the sills margin and hinged covers 1d which are made in sections of suitable length and are adapted to be swung open to permit access to the interior of the casing for insertion and removal of the carriage, or for any repairs or adjustments which may be necessary.

These cover sections are suitably hinged to the upper edges of the side walls 1b as indicated at 1e and when closed have their free edges terminating short of each other so as to leave a space or continuous slot 1f through which the rabbit supporting post projects as hereinafter described.

The bottom of the casing is provided with rails 3 which as they are in the form of flat strips or bars, may be easily and cheaply made of any suitable material and upon these the wheels 4 of the carriage travel. The carriage comprises a rectangular frame 5 in which are journaled, adjacent opposite ends thereof, the axles 6 to the ends of which the wheels are rigidly secured, the carriage being thus supported by four wheels having plant flat treads which run upon the plain flat tracks.

One of the axles is provided with an electric motor 7 which, as it may be of the ordinary or any desired construction, is illustrated in a conventional manner only. The motor receives its electric energy through conductors 8 which are electrically connected to trolley wheels 9 which cooperate with conductor or bus bars 10 carried by lining boards 11 adjacent the upper edges thereof, which boards are secured to the inner faces of the posts or uprights 1c. The bus bars or conductors are in the form of flat bars or plates of suitable conducting material, and the wheels have plain flat treads cooperating therewith.

Each conductor wheel 9 is journaled in a bracket 12 carried by a leaf spring 13, one end of which is rigidly secured to the carriage frame by means such as rivets as indicated at 13a while the other end is slidably held in a retaining member as indicated at 13b. The intermediate portion of the spring which carries the wheel supporting bracket is bowed outwardly and the carriage frame is provided with a bumper 14 in rear of the spring.

It will thus be seen that while the carriage has flat wheels cooperating with flat rails it will be accurately guided in its course by the wheels at the four corners thereof, and it will be further seen that these four wheels not only provide such accurate guiding but ensure an uninterrupted supply of current.

By the arrangement of carriage and trolley wheels as above described I am able to make use of wheels of stock or standard type and flat strips for rails and conductors, thereby greatly reducing the cost, the necessity for rolled rails and grooved wheels being avoided.

The carriage is provided with a post 15, supported by cross struts 5a, which projects upward through the aforesaid slot 1f, said standard being preferably of iron and having welded to the upper end thereof a channel bar 16 in which is supported a lure or rabbit carrying bar or arm 17 which is securely held in position by U bolts 18 and cross plates 18a. To the outer or free end of this bar 17 is pivotally secured at 17a a depending lure carrying arm 19 which is in the form of strap metal having its upper end given a quarter turn for the pivotal connection and having at its lower end a partial loop for encircling or engaging the lure or rabbit. By supporting the rabbit from a relatively high point by a freely swingable arm I avoid all liability of injury to the dogs on overtaking the rabbit or encountering it from the wrong direction, the bar 17 being located high enough to avoid contact with the dog. This arrangement also gives to the lure or rabbit a movement which is attractive or alluring to the dogs.

Having thus described my invention what I claim is:—

1. A racing apparatus of the character described comprising an endless race track, an endless housing situated upon the ground within said track and having an endless slot in its top, a carriage movable within said housing, a post projecting upward from said carriage through said slot, a lure carrying arm projecting laterally from said post and overhanging the race track, the top of the housing comprising cover sections pivoted to the side walls of the housing and having their edges spaced apart to form the slot.

2. A racing apparatus of the character described comprising an endless race track, an endless housing situated upon the ground within said track and having an endless slot in its top, a carriage movable within said housing, a post projecting upward from said carriage through said slot, a lure carrying arm projecting laterally from said post and overhanging the race track, the carriage being provided with wheels running upon rails at the bottom of the housing and having electric motor means receiving current from conductors adjacent the upper corners of the carriage, said carriage having yieldable collector means on opposite sides cooperating with said conductors.

3. A racing apparatus of the character described comprising an endless race track, an endless housing situated upon the ground within said track and having an endless slot in its top, a carriage movable within said housing, a post projecting upward from said carriage through said slot, a lure carrying arm projecting laterally from said post and overhanging the race track, the said housing being provided with rails in the bottom thereof and the said carriage wheels running on said rails, and the carriage having electric motor means for propelling it, said housing having flat conductors on its side walls adjacent the top, said carriage having flat faced conductor wheels on opposite sides electrically connected to said motor means and cooperating with said conductors.

4. Racing apparatus of the character described comprising an endless race track, an endless housing adjacent the same, tracks in the bottom thereof, a carriage having wheels running on said track, an electric motor for propelling said carriage, conductor bars secured to the side walls of the housing adjacent their upper edges, said carriage having outwardly bowed leaf springs on opposite sides thereof, and conductor wheels carried by said springs.

5. Racing apparatus of the character described comprising an endless race track, an endless housing adjacent the same, tracks in the bottom thereof, a carriage having wheels running on said track, an electric motor for propelling said carriage, conductor bars secured to the side walls of the housing adjacent their upper edges, leaf springs on opposite sides of said carriage, each of said springs having one end rigidly secured to the carriage, its opposite end slidably connected thereto, and its intermediate portion bowed outwardly, brackets secured to the outwardly bowed portions, and conductor wheels journaled in said brackets and cooperating with said conductor bars.

In testimony whereof, I affix my signature.

JUNE OLDHAM.